United States Patent [19]

Haberle

[11] Patent Number: 5,671,937
[45] Date of Patent: Sep. 30, 1997

[54] TOWING APPARATUS

[76] Inventor: Jerome B. Haberle, 19875 Highway 81, Maple Grove, Minn. 55311

[21] Appl. No.: 250,374

[22] Filed: May 27, 1994

[51] Int. Cl.$^6$ .................................. B60D 1/06; B60D 1/36
[52] U.S. Cl. .................. 280/407; 280/478.1; 280/483; 280/495; 280/511
[58] Field of Search .................. 280/400, 405.1, 280/406.1, 407, 491.1, 478.1, 482, 483, 491.5, 491.2, 495, 500, 501, 503, 456.1, 415.1, 511

[56] References Cited

U.S. PATENT DOCUMENTS

| | | |
|---|---|---|
| 793,787 | 7/1905 | Heser . |
| 2,142,749 | 1/1939 | Graves . |
| 2,397,964 | 4/1946 | Hiniker . |
| 2,474,296 | 6/1949 | Wiltsee . |
| 2,572,341 | 10/1951 | Hoffman . |
| 2,622,891 | 12/1952 | Knapp .................. 280/483 |
| 2,743,118 | 4/1956 | Dotson . |
| 3,155,399 | 11/1964 | Fetzko .................. 280/482 |
| 3,244,434 | 4/1966 | Reed et al. . |
| 3,385,610 | 5/1968 | Vezina .................. 280/482 |
| 3,717,362 | 2/1973 | Johnson .................. 280/500 |
| 3,768,837 | 10/1973 | Reese .................. 280/495 |
| 3,833,243 | 9/1974 | Hanson .................. 280/477 |
| 4,000,911 | 1/1977 | Weber .................. 280/468 |
| 4,930,800 | 6/1990 | Jean-Luc .................. 280/446.1 |

Primary Examiner—Anne Marie Boehler
Attorney, Agent, or Firm—Palmatier, Sjoquist, Helget & Voigt, P.A.

[57] ABSTRACT

A towing apparatus is disclosed which has a hitch receiver that is moveable underneath a tow vehicle between a rearward hitching position and a forward towing position. The apparatus has a stationary guide rail which is longitudinally mounted underneath the tow vehicle rearward of the rear axle. A carriage is slidably engaged on the guide rail and has a rearwardly extending hitch receiver. At the rearward hitch position the hitch receiver is substantially in the conventional towing position at the rear bumper of the tow vehicle. After hitching a towed vehicle to the receiver, the tow vehicle is backed up to move the carriage and receiver forwardly on the guide rail to the towing position which is ideally adjacent to the rear axle. The carriage and receiver with attached hitch are then locked in place at said position. A towed vehicle may be either directly hitched to the receiver or may be hitched by way of an intermediate coupling section. The coupling section has a hitch to attach to the receiver on the tow vehicle, a second receiver on the coupling section for receiving the towed vehicle hitch and connector brackets that also attach to the towed vehicle. The intermediate coupling section provides an extension for proper positioning of the towed vehicle when the carriage is in the towing position.

19 Claims, 4 Drawing Sheets

TOWING APPARATUS

BACKGROUND OF THE INVENTION

This invention relates generally to towing vehicles. More particularly, it relates to adjustable trailer hitch apparatus.

Towed vehicles such as trailers are generally hitched to tow vehicles at or in proximity to the rear bumper. Such attachment provides for convenient hitching and unhitching of the towed vehicle and is suitable for many applications. However such rear bumper hitching can present significant drawbacks when the towed vehicle is of significant size or weight. The attachment at the rear bumper is remote from the rear axle and under some circumstances, the forces exerted by the towed vehicle may substantially alter the stability and control of the tow vehicle. For example, when braking, the towed vehicle may impart a downward force to the rear bumper of the tow vehicle. The rear wheels and axle act as a fulcrum causing the front wheels of the tow vehicle to raise or unweight, resulting in less traction with the front wheels and problems with braking or steering. Additionally, sideward forces exerted on the rear bumper, such as when the tow vehicle is turning and braking, can cause significant side-sway or catastrophic fish tailing. Positioning of the hitch point close to the rear axle, such as in fifth-wheel trailer arrangements alleviates some of these handling problems. However, many tow vehicles are not suitable for this arrangement in that the bed area above the axle is not available for the fifth wheel arrangement.

SUMMARY OF THE INVENTION

A towing apparatus is disclosed which has a hitch receiver that is moveable underneath a tow vehicle between a rearward hitching position and a forward towing position. The apparatus has a stationary guide rail which is longitudinally mounted underneath the tow vehicle rearward of the rear axle. A carriage is slidably engaged on the guide rail and has a rearwardly extending hitch receiver. At the rearward hitch position the hitch receiver is substantially in the conventional towing position at the rear bumper of the tow vehicle. After hitching a towed vehicle to the receiver, the tow vehicle is backed up to move the carriage and receiver forwardly on the guide rail to the towing position which is ideally adjacent to the rear axle. The carriage and receiver with attached hitch are then locked in place at said position. A towed vehicle may be either directly hitched to the receiver or may be hitched by way of an intermediate coupling section. The coupling section has a hitch to attach to the receiver on the tow vehicle, a second receiver on the coupling section for receiving the towed vehicle hitch and connector brackets that also attach to the towed vehicle. The intermediate coupling section provides an extension for proper positioning of the towed vehicle when the carriage is in the towing position.

An advantage and feature of the invention is that the hitching point close to the rear axle provides much improved towing stability over the conventional rear bumper hitching point.

An advantage and object of the invention is that hitching and unhitching of the towed vehicle from the tow vehicle is easily accomplished.

An object and advantage of the invention is that the hitch receiver is readily accessible at the rear end of the tow vehicle for hitching and may then be longitudinally moved toward the rear axle for additional stability in towing.

Another object and advantage is that the components of the invention are easily fabricated by conventional means and are easily installed on the tow vehicle.

An additional object and advantage is that the invention may be utilized with existing trailers with minimal or no modification to the trailer.

An additional object and advantage is that the intermediate coupling section has shock absorption capabilities to reduce the transmission of forces to the tow vehicle.

An additional object and advantage is that the invention also may be utilized to tow vehicles with the hitch receiver in the conventional position at or below the rear bumper.

DETAILED DESCRIPTION OF THE PREFERRED EMBODIMENTS

Figure 1:
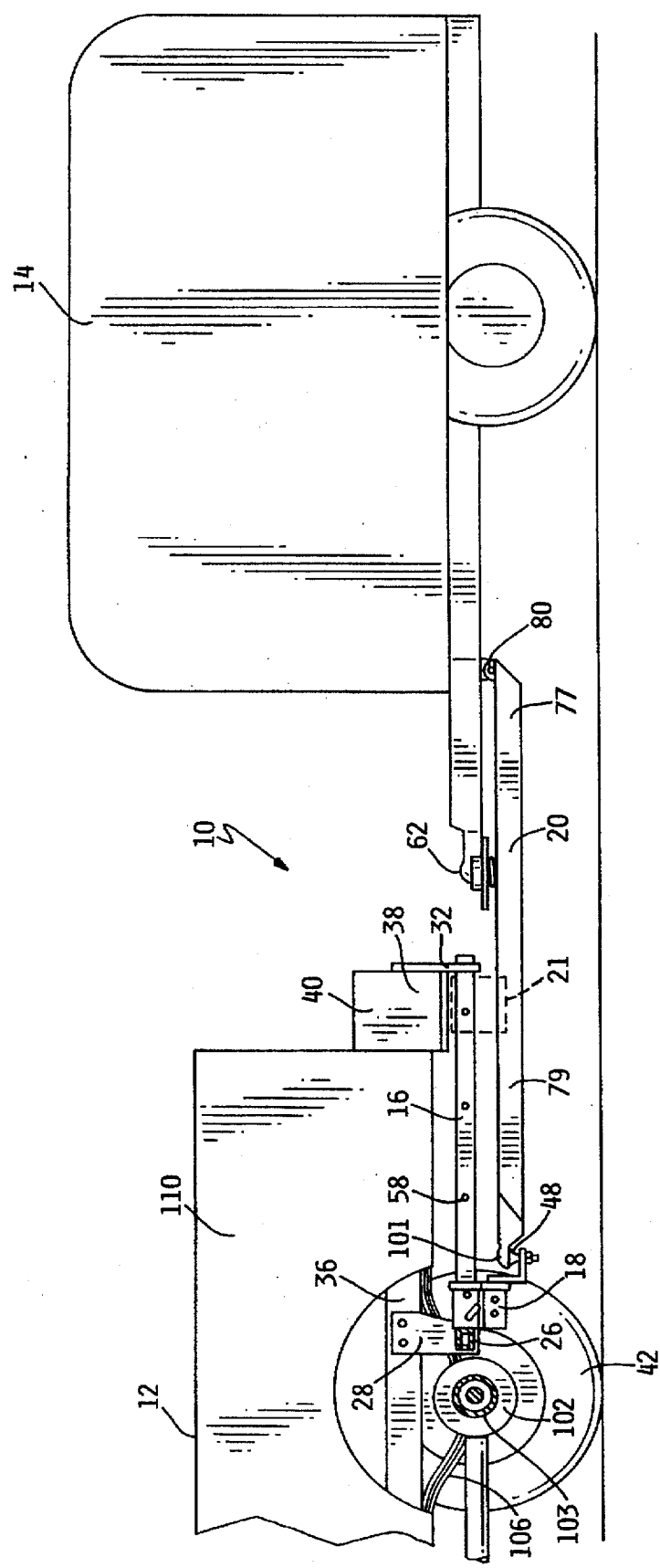
FIG. 1 discloses a plan view of the invention with the carriage and hitch receiver in the towing position.
Figure 2:
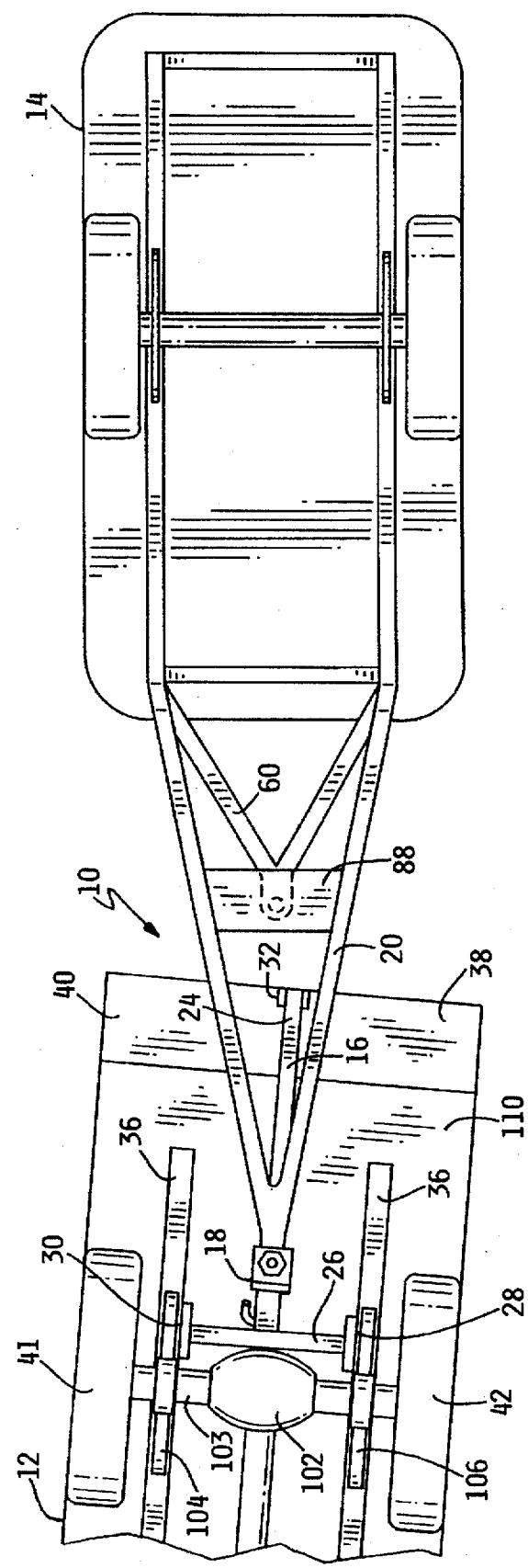
FIG. 2 shows a bottom view of the invention with the carriage and hitch receiver in the towing position.
Figure 3:
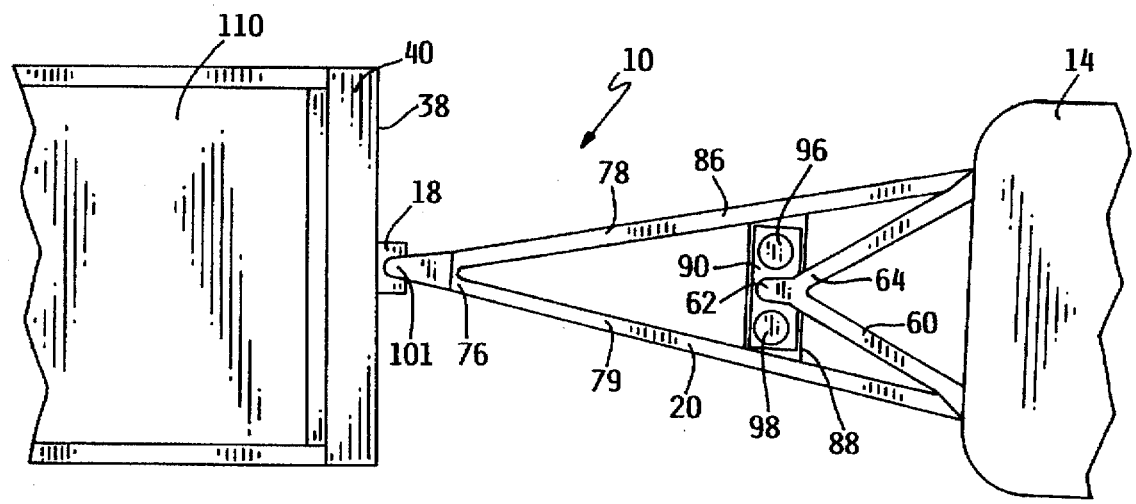
FIG. 3 shows a plan view of the apparatus with the carriage in the hitching position.

Referring to FIGS. 1, 2, and 3, the towing apparatus is shown and is generally indicated by the numeral 10. FIG. 1 is a partial sectional with the left rear tire of a tow vehicle 12 removed to show details of the attachment of the towing apparatus to said vehicle. The towing apparatus 10 is shown connected to a towed vehicle 14. The towing apparatus 10 is comprised principally of a guide rail 16 suspended lengthwise underneath the tow vehicle 12, a carriage 18, and a intermediate coupling section 20. The carriage 18 is slidably engaged with the guide rail 16 and is longitudinally movable from the towing position shown in FIGS. 1 and 2 to the hitching position shown in FIG. 3, and indicated by the dashed lines of FIG. 1 labeled with the numeral 21.

Figure 4:
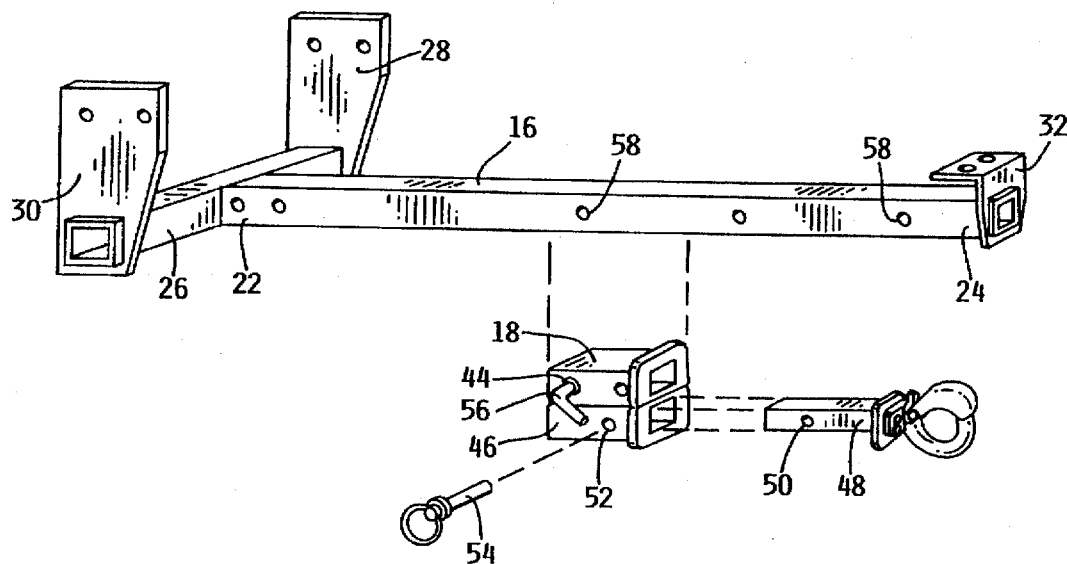
FIG. 4 shows an exploded perspective view of the guide rail, carriage, and hitch receiver.

Referring to FIG. 4, the guide rail 16 is shown in detail, unattached from the tow vehicle 12 and with the carriage 18 removed. The guide rail 16 is generally elongate with a forward portion 22 and a rearward portion 24. The forward portion 22 is attached to a cross member 26 which has two mounting plates 28, 30. The rearward portion 24 has a mounting bracket 32. The guide rail 16 and the cross member 26 may be suitably formed of three or four inch heavy wall square tubing. The mounting plates 28, 30 and the mounting bracket 32 may be fabricated from plate stock. The guide rail 16 as well as the other components are fabricated by conventional means such as by welding. Rather than using a single guide rail, other embodiments may include two or more longitudinally positioned guide rails engaged with the carriage.

As shown in FIGS. 1 and 2, the mounting plates 28, 30 are bolted, welded, or otherwise suitably attached to the underside 34 of the tow vehicle 12 at a frame member 36 or other suitable location. Similarly, the mounting bracket 32 may be attached at the back end 38 of the tow vehicle 12 on the bumper 40. The cross member 26 is positioned intermediate the rear wheels 41, 42 of the tow vehicle 12.

The carriage 18 is also shown in detail in FIG. 4 and is comprised of an upper portion 44 and a lower portion 46. The upper portion 44 also may be fabricated from a portion of heavy wall tubing suitably sized to fit over the guide rail 16 and to slide thereon. The lower portion is sized to accept trailer hitch receivers such as the spindle hitch 48 as shown in FIG. 4 or conventional ball type hitch receivers as shown in FIG. 1. The hitch 48 is secured in the lower portion of the carriage 18 by way of cooperating aligned holes 50, 52 in the hitch receiver and the lower portion respectively and a pin 54 insertable therethrough.

Similarly, the carriage 18 may be locked in place at various positions on the guide rail 16 by locking means such as a pin 56 extending through holes 55 in the upper portion 44. The pin 56 may be suitably inwardly biased such as by a spring, not shown, to comprise a detent mechanism. The carriage 18 is thus lockable in position upon the guide rail wherever suitable holes 58 are in alignment. Other conventional locking means such as bolts or clamps may also be used.

Figure 5:
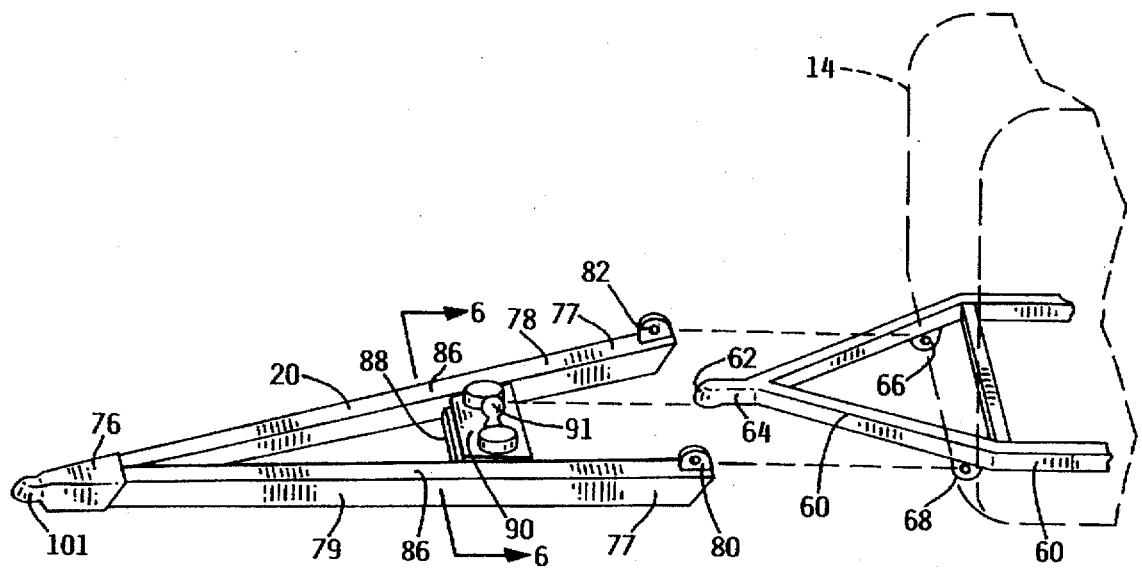
FIG. 5 shows a perspective view of the intermediate coupling section in relationship to the towed vehicle.

Referring to FIG. 5, the relationship between the intermediate coupling section 20 and the towed vehicle 14 is depicted. The towed vehicle 14 has a frame 60 which is shown to be forwardly extending with a first hitch 62 attached to the end 64 of said frame 60. The towed vehicle frame 60 also has two connector brackets 66, 68 welded or otherwise suitably attached on the frame. The intermediate coupling section 20 has a first end 76, a second end 77 and two frame members 78, 79. Attached to the second end 77 are two connectors configured as connecting brackets 80, 82 which are sized and positioned to cooperate with and pivotally attach to the connector brackets 66, 68 located on the towed vehicle frame 60 by way of suitable pins or bolts, not shown. The intermediate coupling section 20 has a intermediate portion 86 with a cross member 88 which supports suspended plate 90. A ball hitch receiver 92 is attached to the suspended plate 90.

Figure 6:
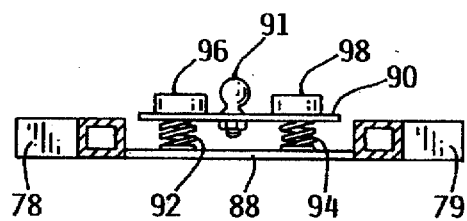
FIG. 6 is a cross-sectional taken at plane 6—6 of FIG. 5.

Referring to FIG. 6, a cross-sectional of the intermediate coupling section 20 is shown taken at plane 6—6 of FIG. 5. The cross member 88 is attached to the frame members 78, 79 by way of welding or other suitable means. Resilient members configured as two springs 92, 94 extend upwardly from the cross member 88 into caps 96, 98 welded on the suspended plate 90. The ball hitch receiver 91, also defined as the second hitch receiver, is positioned intermediate the two springs 92, 94 on the suspended plate 90. The springs 92, 94 are suitably affixed to the cross member 88. The towed vehicle 14 also may be connected to the intermediate coupling section 20 without the use of resilient members. The resilient members provide a shock absorption feature. A second hitch 101 is attached to the first end 76 by welding or other suitable means.

The resilient members configured as springs 92, 94 as part of the intermediate coupling section 20 are especially useful when the towed vehicle has hydraulic brakes. As a result of such an application, the resilient members absorb the downward force from use of said hydraulic brakes and substantially relieve said transfer of said downward forces to the towed vehicle.

Referring to FIGS. 1 and 2, it is seen that the guide rail 16 is positioned just rearwardly of the differential 102 of the tow vehicle 12. It is advantageous from a stability perspective to have the towing position as close to the rear axle 103 as possible. The mounting plates 28, 30 are positioned so as not to interfere with the movement of the leaf springs 104, 106.

The towing apparatus operates as follows: Referring to FIG. 5, the intermediate coupling section 20 is first attached to the frame 60 of the towed vehicle 14 by connecting brackets 80, 82 to the corresponding connector brackets 66, 68 on the towed vehicle frame 60 by suitable pins or bolts. The first hitch 62 is hitched to the second hitch receiver 91 on the suspended plate 90 of the intermediate coupling section 20.

The carriage 18 is slid to the most rearward position, the hitching position, which is shown by FIG. 3 and by the phantom lines 21 of FIG. 1. The tow vehicle 12 and towed vehicle 14 are then appropriately maneuvered so that the second hitch 101 of the intermediate coupling section 20 may be hitched onto the first hitch receiver 48. Once the second hitch 101 is suitably fastened, the carriage 18 is moved longitudinally on the guide rail 16 forwardly to an appropriate position on the guide rail 16 such as the towing position as shown in FIGS. 1 and 2. In said position the pin 56 is secured through the upper portion 44 and the guide rail 16 to lock the carriage 18 in the towing position. Safety chains are attached by conventional means both from the towed vehicle frame 60 to the intermediate coupling section 20 and between the intermediate coupling section 20 and tow vehicle 12. The safety chains, not shown in the drawings, are of conventional design. The apparatus is ready for towing. Where the towed vehicle has a suitable frame extending far enough forward, the intermediate coupling section 20 is not necessary. Such a suitable towed vehicle is connected and towed as described above, but without the use of the intermediate coupling section 20.

In suitable applications, the carriage may be locked in positions other than the towing position as shown in FIGS. 1 and 2. For example, the apparatus can be utilized with the carriage 18 in the hitching position 21 in certain towing applications.

Referring to FIGS. 1, 2, and 3, the towing apparatus is particularly useful with tow vehicles, such as conventional pickups, which have a cargo or equipment area 110 above and extending rearwardly of the rear axle and wheels as depicted in FIGS. 1, 2, and 3. Such vehicles would normally have a hitch receiver at the rear bumper 40 which is substantially spaced from the rear axle 103 due to the cargo area 110.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A towing apparatus for towing a towed vehicle by a tow vehicle the tow vehicle having a back end and a first hitch receiver positioned forwardly of the back end, the towed vehicle having a first hitch, the apparatus comprising: an intermediate coupling section comprised of a coupling frame having a first end and second end opposite the first end, a second hitch attached to the first end, said second hitch hitchable to the first hitch receiver, a connector bracket at the second end, said connector bracket connectable to the towed vehicle frame, and a second hitch receiver attached to the coupling frame, the first hitch of the towed vehicle hitchable to said second hitch receiver, further comprising a guide rail mounted underneath the tow vehicle and a carriage slidably engaged with said guide rail, the carriage further comprising a first portion suitably sized to fit over the guide rail and slide thereon between a rearward hitching position and a forward towing position, the carriage lockable to said guide rail at the towing position, the carriage having a second portion for accepting a hitch receiver, the first hitch receiver attached to said carriage.

2. The combination of claim 1, wherein the intermediate coupling section comprises a resilient member intermediate the second receiver and the coupling frame.

3. The apparatus of claim 1, wherein the second hitch receiver is positioned intermediate the first end and the second end.

4. The apparatus of claim 1, wherein the tow vehicle has a rearward cargo area and the guide rail is positioned below the cargo area.

5. A combination tow vehicle with a towing apparatus for towing a towed vehicle, the tow vehicle comprising a back end, a rear bumper, an underside, a pair of rear wheels and a rear axle, the towing apparatus mounted on the underside of said towing vehicle intermediate the back end and the rear axle, the towing apparatus comprising:

an elongate guide rail with a forward portion and a rearward portion, the guide rail mounted lengthwise on the underside of the tow vehicle with the rearward portion mounted at the back end and the forward portion mounted towards the rear axle, a carriage comprising a first portion and a second portion, the first portion slidably engaged with and extending around the guide rail, the carriage slidable between the rearward portion and the forward portion, the second portion extending downward from the first portion and having a hitch receiver under the guide rail when the carriage is at the rearward position, said rearward position defining a hitching position, the carriage with the hitch attached is slidable to the forward position on the guide rail, said forward position defining a towing position, the carriage lockable on the guide rail at said towing position.

6. The combination of claim 5, wherein the guide rail is mounted to the tow vehicle at the forward portion and at the rearward portion of the guide rail and is laterally centered with respect to the tow vehicle.

7. The combination of claim 5, wherein the first hitch receiver is removably attached to the carriage.

8. The combination of claim 5, wherein the forward portion of the guard rail is mounted adjacent to the rear axle and the rearward portion of the guard rail is mounted at the back end of the tow vehicle.

9. The combination of claim 5, further comprising a pin engageable with the guide rail and the carriage to lock the carriage with respect to the guide rail.

10. The combination of claim 5, wherein the towing apparatus further comprises an intermediate coupling section comprised of a coupling frame having a first end and a second end opposite the first end, a second hitch attached to the first end, said second hitch hitchable to the first hitch receiver, a connector bracket at the second end, said connector bracket connected to the towed vehicle frame, and a second hitch receiver attached to the coupling frame, the first hitch of the towed vehicle hitchable to said second hitch receiver.

11. The combination of claim 10, wherein the intermediate coupling section comprises a resilient member intermediate the second receiver and the coupling frame.

12. The combination of claim 5, wherein the tow vehicle has a cargo area and the guide rail is positioned below the cargo area.

13. A combination towing apparatus and a tow vehicle, the towing apparatus mounted on the tow vehicle and longitudinally adjustable with respect to the tow vehicle between a rearward hitching position and a forward towing position, the tow vehicle comprising a back end, an underside, and rear wheels, the towing apparatus comprising:

a) an elongate stationary guide rail having a forward portion and a rearward portion, the guide rail mounted lengthwise on the underside of the tow vehicle, whereby the rearward portion is at the back end of the tow vehicle and the forward portion is intermediate the rear wheels;

b) a carriage engaged with the guide rail and longitudinally moveable thereon, the carriage comprising a first portion suitably sized to fit over the guide rail and slide thereon between the rearward portion and the forward portion the carriage lockable to said guide rail at the towing position, the carriage have a second portion for accepting a first hitch receiver; and c) the first hitch receiver attached to the lower portion of the carriage.

14. The combination of claim 13, wherein the guide rail is mounted to the tow vehicle at the forward portion and at the rearward portion and is laterally centered with respect to the tow vehicle.

15. The combination of claim 14, wherein the first hitch receiver is removably attached to the carriage.

16. The combination of claim 14, further comprising a pin engageable with the guide rail and the carriage to lock the carriage with respect to the guide rail.

17. The combination of claim 14, wherein the towing apparatus further comprises an intermediate coupling section comprised of a coupling frame having a first end and a second end opposite the first end, a second hitch attached to the first end, said second hitch hitchable to the first hitch receiver, a connector bracket at the second end, said connector bracket connectable to the towed vehicle frame, and a second hitch receiver attached to the coupling frame, the hitch of the towed vehicle hitchable to said second hitch receiver.

18. The combination of claim 17, wherein the intermediate coupling section comprises a resilient member intermediate the second receiver and the frame.

19. The combination of claim 14, wherein the tow vehicle has a rearward cargo area and said guide rail is adapted to be positioned below said cargo area.

\* \* \* \* \*